United States Patent
Yim et al.

(10) Patent No.: US 7,993,778 B2
(45) Date of Patent: Aug. 9, 2011

(54) LITHIUM ION SECONDARY BATTERY HAVING SAFETY VENT RESPONSIVE TO TEMPERATURE AND PRESSURE

(75) Inventors: Hoon Yim, Chungcheongnam-do (KR); Soo-Yeon Maeng, Incheonkwangyok-si (KR)

(73) Assignee: Samsung SDI Co., Ltd., Yongin-si (KR)

( * ) Notice: Subject to any disclaimer, the term of this patent is extended or adjusted under 35 U.S.C. 154(b) by 1133 days.

(21) Appl. No.: 11/158,285

(22) Filed: Jun. 20, 2005

(65) Prior Publication Data

US 2006/0024574 A1  Feb. 2, 2006

(30) Foreign Application Priority Data

Jun. 22, 2004  (KR) .................. 10-2004-0046671

(51) Int. Cl.
  *H01M 2/12*  (2006.01)
  *H01M 2/00*  (2006.01)
  *H01M 2/08*  (2006.01)
(52) U.S. Cl. ........ 429/185; 429/163; 429/164; 429/174; 429/175; 429/176; 429/177
(58) Field of Classification Search ............... 429/53–56
  See application file for complete search history.

(56) References Cited

U.S. PATENT DOCUMENTS

| | | | | |
|---|---|---|---|---|
| 2,907,489 | A | * | 10/1959 | Taylor, III ............... 220/258.3 |
| 5,693,430 | A | * | 12/1997 | Iwatsu et al. ............... 429/72 |
| 5,989,492 | A | * | 11/1999 | Larsson ................... 419/36 |
| 6,472,096 | B2 | * | 10/2002 | Park et al. ................ 429/73 |
| 2003/0232236 | A1 | * | 12/2003 | Mitchell et al. ............ 429/56 |

FOREIGN PATENT DOCUMENTS

| | | |
|---|---|---|
| CN | 1501525 A | 6/2004 |
| JP | 9-115498 | 5/1997 |
| JP | 09-120811 | 5/1997 |
| JP | 2002-042774 | 2/2002 |
| JP | 2003-051292 | 2/2003 |
| JP | 2003-142040 | 5/2003 |

OTHER PUBLICATIONS

Patent Abstracts of Japan for Publication No. 09-115498; dated May 2, 1997 in the name of Takashi Yonemura et al.
SIPO Office action dated Sep. 7, 2007, for corresponding Chinese Patent application 200510077704.X, with English translation.

* cited by examiner

*Primary Examiner* — Dah-Wei D Yuan
*Assistant Examiner* — Kwang Han
(74) *Attorney, Agent, or Firm* — Christie, Parker & Hale, LLP

(57) ABSTRACT

A lithium ion secondary battery having a safety vent responsive to temperature and pressure. The lithium ion secondary battery includes an electrode assembly having a positive electrode plate, a separator, and a negative electrode plate which are simultaneously wound and laminated, and positive and negative electrode leads extending outward from the positive and negative electrode plates, respectively. A can containing the electrode assembly and having an opening; and a cap plate coupled to the opening of the can, wherein an electrode terminal extends through and is coupled to the center of the cap plate with a gasket interposed therein, the negative electrode lead being connected to the electrode terminal, the positive electrode lead being connected to the cap plate, a coupling hole being formed on the cap plate, and a safety vent adapted to soften at a predetermined temperature is coupled to the coupling hole.

25 Claims, 3 Drawing Sheets

LITHIUM ION SECONDARY BATTERY HAVING SAFETY VENT RESPONSIVE TO TEMPERATURE AND PRESSURE

CROSS REFERENCE TO RELATED APPLICATION

This application claims priority to and the benefit of Korea Patent Application No. 2004-0046671 filed on Jun. 22, 2004, in the Korean Intellectual Property Office, the entire content of which is incorporated herein by reference.

BACKGROUND OF THE INVENTION

1. Field of the Invention

The present invention relates to a lithium ion secondary battery, and more particularly to a lithium ion secondary battery having a safety vent responsive to temperature and pressure for improved safety.

2. Description of the Prior Art

As generally known in the art, a lithium ion secondary battery includes an electrode assembly having a positive electrode plate with positive electrode active materials attached thereto, a negative electrode plate with negative electrode active materials attached thereto, and a separator positioned between the positive and negative electrode plates to prevent a short circuit and to allow movement of lithium ions. The positive and negative electrode plates and the separator may be wound into a jelly roll configuration. The secondary battery may also include an electrolyte for enabling lithium ions to move; a can which contains the electrode assembly and the electrolyte and which is then sealed; and a cap assembly for covering the can and preventing the electrode assembly from escaping.

Such a lithium ion secondary battery may be manufactured as follows: a positive electrode plate having positive electrode active materials attached thereto, a negative electrode plate having negative electrode active materials attached thereto, and a separator are laminated and wound into a jelly roll configuration and placed into a square type can. Then, a cap assembly is welded to the top of the can to seal it and an electrolyte is injected into the can. A bare cell then may be charged and inspected and various safety devices may be attached to the bare cell to complete a conventional battery pack.

A constant voltage/current charging method is used for lithium ion secondary batteries and overcharging does not occur as long as the charging voltage is correctly controlled in chargers. However, abnormal charging sometimes occurs as the chargers are damaged or erroneously operated. When this happens, the electrical potential of positive electrode active materials, e.g., lithium cobalt oxide ($LiCoO_2$), continuously rises causing unceasing rise of the battery voltage and an abnormal heating phenomenon.

Safety measures against such overcharging include a positive temperature coefficient (PTC) thermistor, a separator having a shutdown function, and a safety vent actuated by gas generation. As used herein, a safety vent of a square-type lithium ion secondary battery generally refers to a relatively thin region formed on the bottom surface of the can or on the cap assembly which is adapted to fracture during severe swelling caused by gas generation and allows gas to be discharged to outside the battery.

The gas generation occurs when the amount of lithium carbonate ($Li_2CO_3$) added to form positive electrode active materials, such as $LiCoO_2$, exceeds the stoichiometry. Particularly, the extra lithium carbonate remains in a non-reacted state within the positive electrode active materials (lithium cobalt oxide) and decomposes to produce carbonate gas when abnormal charging increases the battery voltage and generates heat. Such production of carbonate gas generally causes the can to swell excessively. The safety vent is actuated when the can swells severely and prevents the explosion and/or firing of the battery.

The swelling of the can may be avoided by reducing the amount of lithium carbonate added. However, cobalt oxide ($CoO_2$) then remains in the positive electrode active materials and corrodes the positive electrode, which dissolves into the electrolyte during charging. This causes cobalt precipitation to the negative electrode, which increases the possibility of an internal short circuit. As such, the excessive addition of $Li_2CO_3$ is inevitable.

As mentioned above, the safety vent is not actuated until the battery pressure reaches a predetermined level. However, temperature, as well as battery pressure, generally increase during overcharging. Therefore, safety can be additionally improved if the safety vent is actuated in response not only to pressure, but also to temperature.

However, the conventional safety vent formed on the cap assembly or the can with a reduced thickness, as mentioned above, is actuated in response only to the battery pressure, and not to the battery temperature. Thus, there is a need for a safety vent that may be actuated in response to battery pressure as well as battery temperature.

SUMMARY OF THE INVENTION

A lithium ion secondary battery is provided having a safety vent responsive to temperature and pressure. The battery includes an electrode assembly having a positive electrode plate, a separator, and a negative electrode plate which are wound a number of times while being laminated. Additionally, positive and negative electrode leads are provided extending outward a predetermined length from the positive and negative electrode plates, respectively; as well as a can containing the electrode assembly and having an opening formed on an end thereof. A cap plate is coupled to the opening of the can, wherein an electrode terminal extends through and is coupled to the center of the cap plate with a gasket interposed therein. Further, the negative electrode lead is connected to the electrode terminal, the positive electrode lead is connected to a side of the cap plate, a coupling hole is formed on the other side of the cap plate, and a safety vent adapted to soften at a predetermined temperature is coupled to the coupling hole.

In one exemplary embodiment of the lithium ion secondary battery of the present invention, the safety vent plugs the coupling hole formed through the cap plate and itself softens and opens the through-hole to discharge internal gas when the temperature of the battery rises above a predetermined level due to overheating.

As such, the safety vent is actuated in response to both temperature and pressure of the battery and additionally improves the safety of the battery.

DETAILED DESCRIPTION

Figure 1:
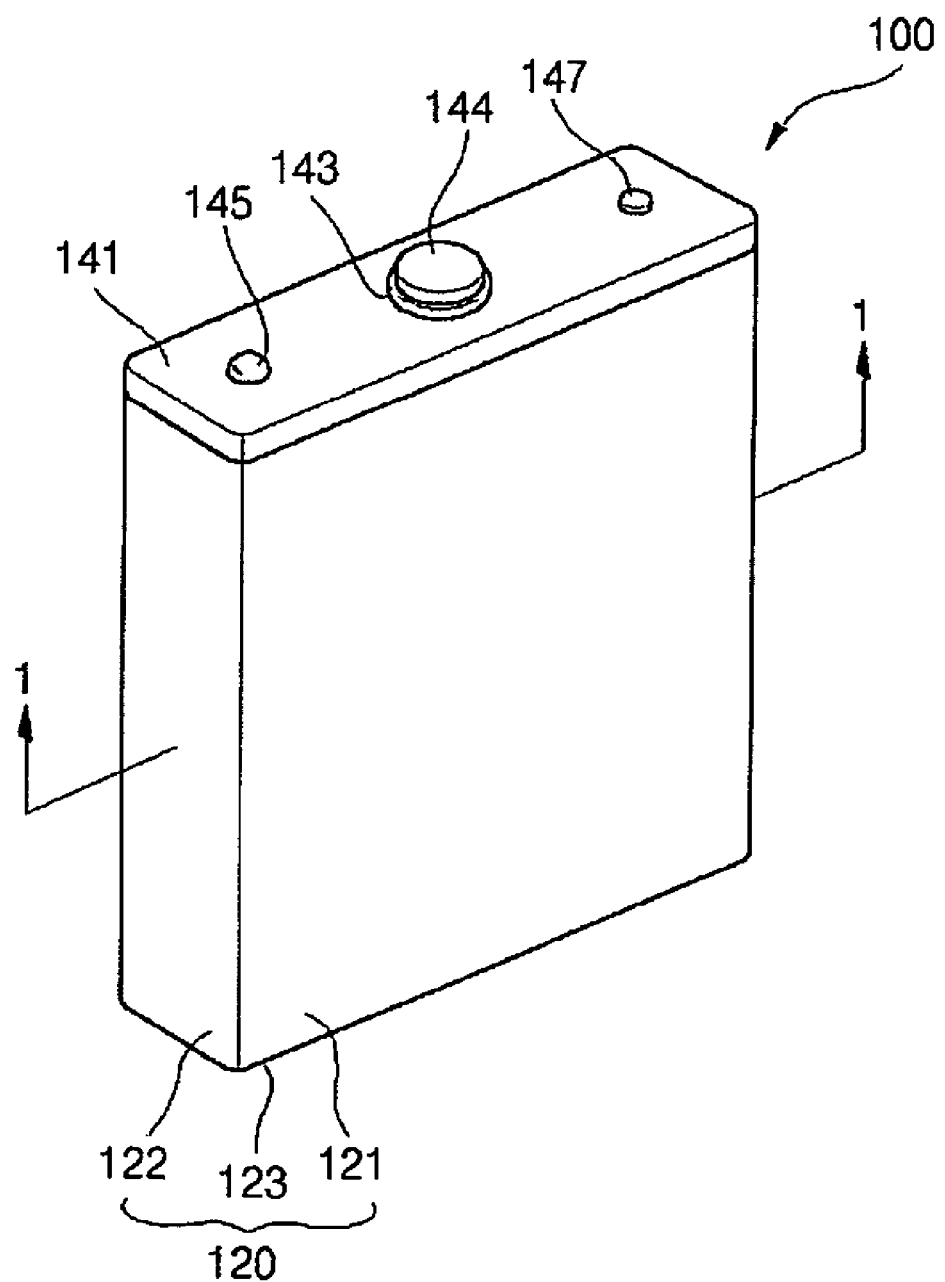
FIG. 1 is a perspective view showing a lithium ion secondary battery having a safety vent responsive to temperature and pressure according to the present invention.
Figure 2:
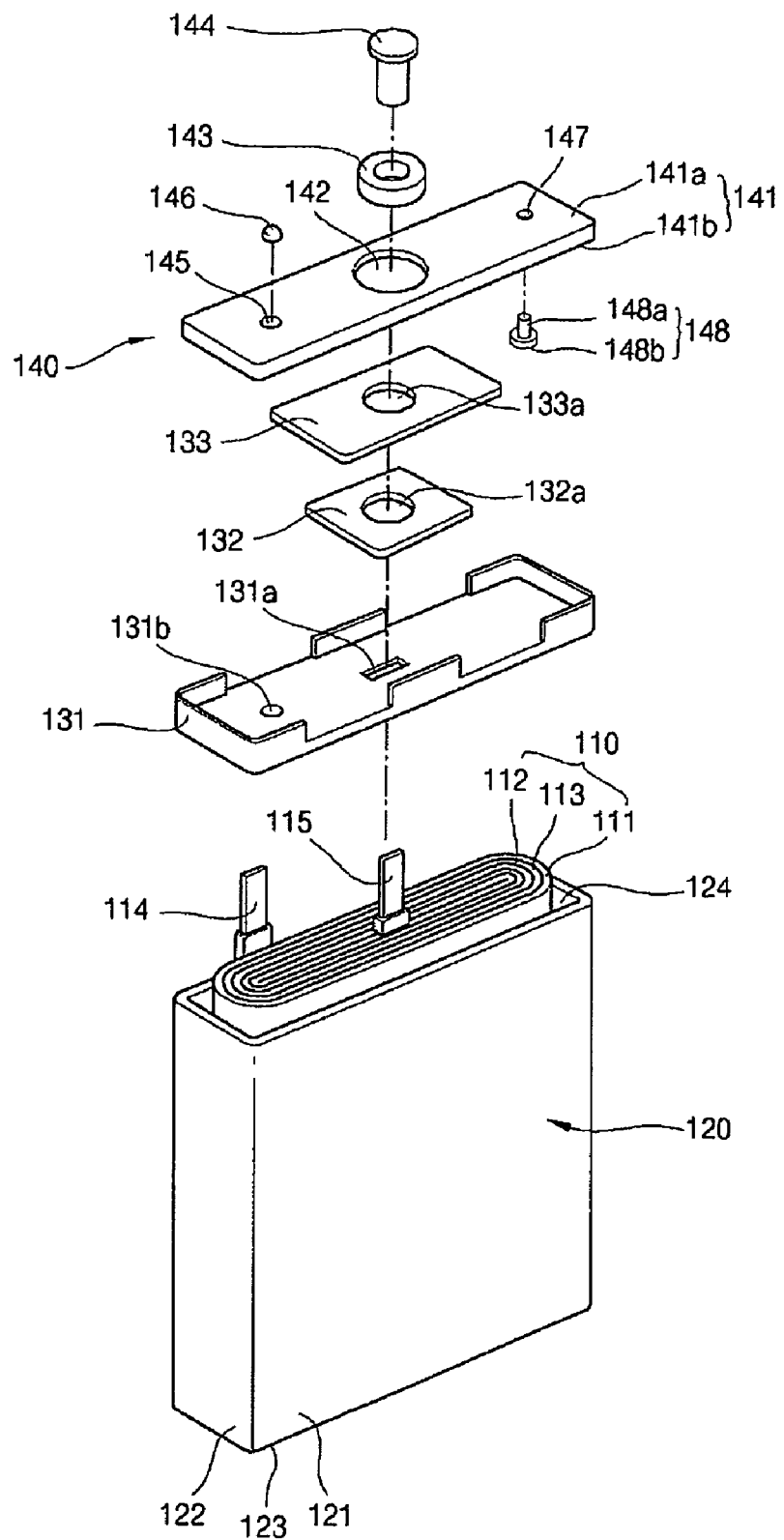
FIG. 2 is an exploded perspective view of the lithium ion secondary battery shown in FIG. 1.
Figure 3:
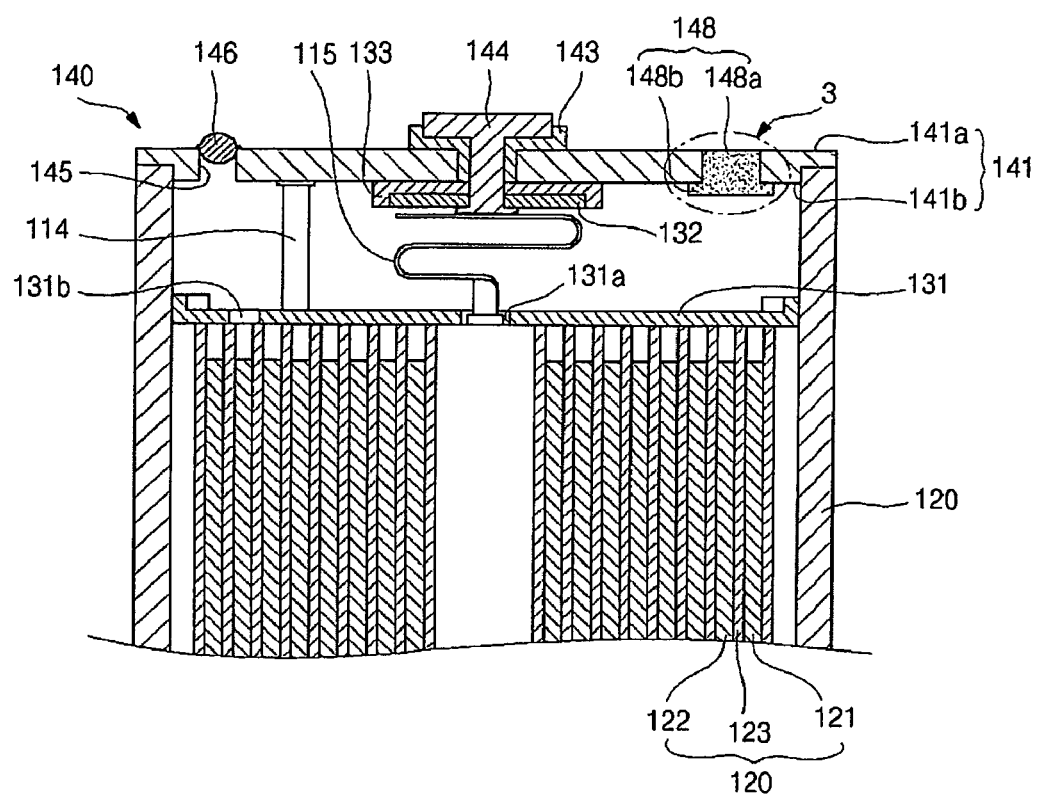
FIG. 3 is a sectional view taken along line 1-1 of FIG. 1.

As shown in FIGS. 1 to 3, a lithium ion secondary battery 100 according to an exemplary embodiment of the present invention includes an electrode assembly 110, a can 120 containing the electrode assembly 110, an electrolyte (not shown) injected into the can 120 to allow lithium ions to move, and a cap assembly 140 which covers the can 120 and prevents the electrode assembly 110 and the electrolyte from escaping to the exterior and which has a safety vent 148 adapted to soften at a predetermined temperature.

The electrode assembly 110 includes a positive electrode plate 111 having positive electrode active materials (not shown), for example $LiCoO_2$, attached thereto, a negative electrode plate 112 having negative electrode active materials (not shown), for example, graphite, attached thereto, and a separator 113 positioned between the positive and negative electrode plates 111 and 112 to prevent a short circuit and to allow only lithium ions to move. The positive and negative electrode plates 111 and 112 and the separator 113 are wound a number of times into a jelly roll configuration while being laminated and are placed in the can 120. The positive electrode plate 111 may be made of aluminum (Al) foil, the negative electrode plate 112 may be made of copper (Cu) foil, and the separator 113 may be made of polyethylene (PE) or polypropylene (PP), but the materials are not limited to those mentioned in the present invention. The positive electrode plate 111 has a positive electrode lead 114 welded thereto while protruding upward a predetermined length and the negative electrode plate 112 has a negative electrode lead 115 welded thereto while protruding upward a predetermined length. The positive electrode lead 114 may be made of Al and the negative electrode lead 115 may be made of nickel (Ni), but the materials are not limited to those described herein.

The can 120 includes at least one first surface 121, at least one second surface 122 connected to the first surface 121 and having a smaller area than the first surface 121 and a third surface 123 connected to both first and second surfaces 121 and 122. The can 120, which in one exemplary embodiment is a hexahedron, has an opening 124 formed at the top thereof which faces the third surface 123. The can 120 may be made of Al, an iron (Fe) alloy, or an equivalent thereof, but the material is not limited to those described herein.

An electrolyte (not shown) is injected into the can 120 and is positioned between the positive and negative electrode plates 111 and 112 of the electrode assembly 110. The electrolyte acts as a medium for movement of lithium ions created by electrochemical reactions at the positive and negative electrode plates 111 and 112 inside the battery during charging and discharging. The electrolyte may be a non-aqueous organic electrolyte which is a mixture of a lithium salt and a high-purity organic solution. The electrolyte may also be a polymer using a high-molecular electrolyte.

In one exemplary embodiment, an insulation case 131, a terminal plate 132, and an insulation plate 133 may be successively coupled to the opening 124 of the can 120 on top of the electrode assembly 110. The insulation case 131, the terminal plate 132, and the insulation plate 133 have through-holes 131a, 132a, and 133a formed therein so that the negative electrode lead 115 can extend upward through them. The insulation plate 133 has an electrolyte through-hole 131b formed therein so that when an electrolyte is injected through a cap plate 141 (described later), the electrolyte can easily flow to the electrode assembly 110.

The cap assembly 140 is laser-welded to the opening 124 of the can 120 and includes an approximately rectangular plate-shaped cap plate 141. The cap plate 141 has a through-hole 142 formed at the center thereof with a predetermined size, an electrolyte injection hole 145 formed on a side thereof for injecting an electrolyte, and a coupling hole 147 formed on the other side thereof for coupling the safety vent 148 thereto. An insulation gasket 143 is coupled to the through-hole 142 of the cap plate 141 and an electrode (negative electrode) terminal 144 is coupled to the insulation gasket 143. The electrode terminal 144 is welded to the negative electrode lead 115 to act as a negative electrode during charging or discharging of the battery. The positive electrode lead 114 is welded between the electrode injection hole 145 of the cap plate 141 and the electrode terminal 144, so that the cap plate 141 and the can 120 as a whole play the role of a positive electrode. After an electrolyte is injected through the electrolyte injection hole 145 of the cap plate 141, a plug 146 is coupled and welded thereto to prevent the electrode from leaking out.

The safety vent 148 having, for example, an approximately cylindrical shape is coupled to the coupling hole 147 formed on the cap plate 141. Particularly, the safety vent 148 includes an approximately cylindrical body 148a having the same diameter with the coupling hole 147 and an approximately disk-shaped catching plate 148b having a larger diameter than the body 148a and positioned on the bottom of the body 148a.

The safety vent 148 has a softening point of 70-150° C., and in one exemplary embodiment, a softening point of 90-100° C. If the softening point is below 70° C., a melting problem may occur during an aging process when the secondary battery is manufactured. If the softening point is above 150° C., the secondary battery may explode due to overheating. According to this configuration, the safety vent 148 softens and opens the coupling hole 147 when the temperature of the secondary battery 100 rises above a reference level due to overcharging. As a result, gas in the interior of the secondary battery 100 under high pressure is easily discharged to the exterior and the explosion or firing of the battery is prevented.

The safety vent 148 may be made of plastic. As is widely known in the art, plastic may be classified into thermosetting resin and thermoplastic resin and the latter may be used in an exemplary embodiment of the present invention.

More particularly, the safety vent 148 may be made up of any one chosen from vinyl polymerized polyethylene (PE), polypropylene (PP), polystyrene (PS), polyvinyl chloride (PVC), polyvinylidene dichloride (PVDC), fluorine resin, acryl resin, and polyacetate vinyl resin.

The safety vent 148 may also be made up of any one chosen from polycondensation ring-opening polymerized polyamide resin, acetal resin, polycarbonate (PC), polyphenylene oxide, polyester, polysulphone, and polyimide.

Instead of a plastic-based material, the safety vent 148 may be made of a metal-based material. Particularly, the safety vent 148 may be made up of an alloy of tin (Sn), zinc (Zn), and lead (Pb), an alloy of tin (Sn), lead (Pb), and bismuth (Bi), or an equivalent thereof. More particularly, the safety vent 148 may be made up of an alloy including 70-90% of tin (Sn), 5-10% of zinc (Zn), 1-4% of lead (Pb), and balance of other metal or an alloy including 22% of tin (Sn), 28% of lead (Pb), and 50% of bismuth (Bi).

Figure 4:
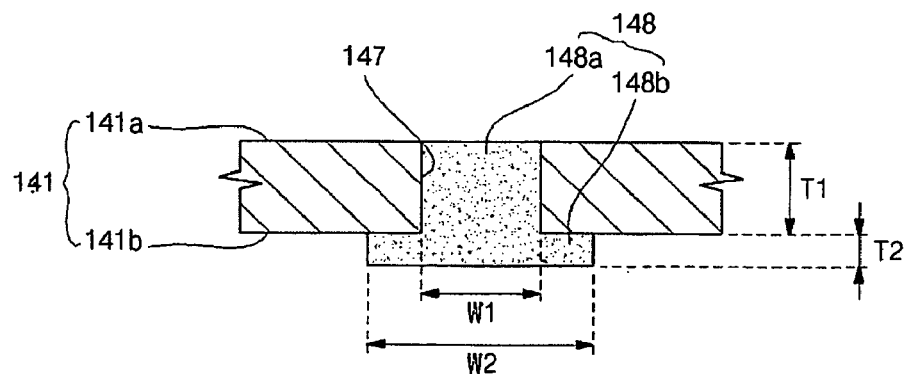
FIG. 4 is a magnified view of area 3 shown in FIG. 3.

Referring to FIG. 4, a magnified view of area 3 shown in FIG. 3 is illustrated.

As shown, the cap plate 141 has a substantially planar first surface 141a, a substantially planar second surface 141b opposite to the first surface 141a, and a coupling hole 147 formed with a predetermined diameter between the first and second surfaces 141a and 141b so that the safety vent 148 can be coupled thereto as mentioned above. The safety vent 148 having a body 148a and a catching plate 148b is coupled to the coupling hole 147. The diameter of the catching plate 148b in one exemplary embodiment corresponds to about 1.1-2 times that of the body 148a. If the diameter of the catching plate 148b is smaller than 1.1 times that of the body 148a, the safety vent 148 may be actuated below the reference temperature and pressure and degrade the credibility of the battery 100. If the diameter of the catching plate 148b is larger than 2 times that of the body 148a, the safety vent 148 may fail to be actuated even at the reference temperature and pressure or above and degrade the safety of the battery 100.

In one exemplary embodiment, the thickness of the body 148a of the safety vent 148 is equal to the distance between the first and second surfaces 141a and 141b of the cap plate 141 and the thickness of the catching plate 148b corresponds to 0.1-0.9 times that of the body 148a. If the thickness of the catching plate 148b is less than 0.1 times that of the body 148a, the safety vent 148 may be actuated below reference temperature and pressure and degrade the credibility of the battery 100. If the thickness of the catching plate 148b is greater than 0.9 times that of the body 148a, the safety vent 148 may fail to be actuated even at the reference temperature and pressure or above and degrade the safety of the battery 100.

Although the safety vent 148 has been described with reference to an example having a cylindrical body 148a and a disk-shaped catching plate 148b, the configuration of the safety vent 148 is not limited to the above-mentioned example. For example, the safety vent 148 may include a body having the shape of a triangular post, a square post, a pentagonal post, or any other shape and a catching plate having the shape of a triangular plate, a square plate, a pentagonal post, or any other shape.

The safety vent is released from the through-hole when internal pressure, as well as temperature, rises above a predetermined level and discharges internal gas. As such, the safety vent is actuated in response to both temperature and pressure of the battery and thus improves the safety of the battery.

Although exemplary embodiments of the present invention have been described for illustrative purposes, those skilled in the art will appreciate that various modifications, additions and substitutions are possible, without departing from the scope and spirit of the invention as disclosed in the accompanying claims.

What is claimed is:

1. A lithium ion secondary battery comprising:
   an electrode assembly having a positive electrode plate, a separator, and a negative electrode plate which are simultaneously wound and laminated, a positive electrode lead extending outward from the positive electrode plate and a negative electrode lead extending outward from the negative electrode plate;
   a can containing the electrode assembly, the can having an opening formed on an end thereof; and
   a cap plate coupled to the opening of the can, the cap plate having a coupling hole formed through the cap plate and a safety vent plug plugging the coupling hole, the safety vent plug being adapted to soften at a predetermined temperature and open the coupling hole to discharge internal gas;
   wherein an electrode terminal is extendable through and couplable to a substantially central portion of the cap plate with a gasket interposed therein;
   wherein the negative electrode lead is connectable to the electrode terminal;
   wherein the positive electrode lead is connectable to a side of the cap plate; and
   wherein the safety vent plug comprises a body and a single catching plate, the thickness of the catching plate being between about 0.1-0.9 times that of the body, and the catching plate of the safety vent plug is inside the can containing the electrode assembly.

2. A lithium ion secondary battery as claimed in claim 1, wherein the safety vent plug is made of plastic.

3. A lithium ion secondary battery as claimed in claim 1, wherein the safety vent plug is made of thermoplastic resin.

4. A lithium ion secondary battery as claimed in claim 1, wherein the safety vent plug comprises a material selected from the group consisting of polyethylene, polypropylene, polystyrene polyvinyl chloride, polyvinylidene dichloride, fluorine resin, acryl resin, and polyacetate vinyl resin.

5. A lithium ion secondary battery as claimed in claim 1, wherein the safety vent plug comprises a material selected from the group consisting of polyamide resin, acetal resin, polycarbonate, polyphenylene oxide, polyester, polysulphone, and polyimide.

6. A lithium ion secondary battery as claimed in claim 1, wherein the safety vent plug is made up of an alloy of tin, zinc, and lead.

7. A lithium ion secondary battery as claimed in claim 1, wherein the safety vent plug is made up of an alloy of tin, lead, and bismuth.

8. A lithium ion secondary battery as claimed in claim 1, wherein the safety vent plug has a softening point of between about 70-150° C.

9. A lithium ion secondary battery as claimed in claim 8, wherein the safety vent plug has a softening point of between about 90-100° C.

10. A lithium ion secondary battery as claimed in claim 1, wherein the body has substantially the same diameter as the coupling hole and the catching plate has a larger diameter than the body, the catching plate being positioned at one end of the body.

11. A lithium ion secondary battery as claimed in claim 10, wherein the diameter of the catching plate corresponds to between about 1.1-2 times that of the body.

12. A lithium ion secondary battery comprising:
    an electrode assembly;
    a can containing the electrode assembly; and
    a cap plate adapted to cover the can and having a safety vent plug plugging a coupling hole formed through the cap plate, the safety vent plug being adapted to soften at a predetermined temperature and open the coupling hole to discharge internal gas,
    wherein the safety vent plug comprises a body and a single catching plate, and the catching plate of the safety vent plug is inside the can containing the electrode assembly.

13. A lithium ion secondary battery as claimed in claim 12, wherein the safety vent plug is made of plastic.

14. A lithium ion secondary battery as claimed in claim 12, wherein the safety vent plug is made of thermoplastic resin.

15. A lithium ion secondary battery as claimed in claim 12, wherein the safety vent plug comprises a material selected from the group consisting of polyethylene, polypropylene, polystyrene, polyvinyl chloride, polyvinylidene dichloride, fluorine resin, acryl resin, and polyacetate vinyl resin.

16. A lithium ion secondary battery as claimed in claim 12, wherein the safety vent plug comprises a material selected from the group consisting of polyamide resin, acetal resin, polycarbonate, polyphenylene oxide, polyester, polysulphone, and polyimide.

17. A lithium ion secondary battery as claimed in claim 12, wherein the safety vent plug is made of an alloy of tin, zinc, and lead.

18. A lithium ion secondary battery as claimed in claim 12, wherein the safety vent plug is made up of an alloy of tin, lead, and bismuth.

19. A lithium ion secondary battery as claimed in claim 12, wherein the safety vent plug has a softening point of between about 70-150° C.

20. A lithium ion secondary battery as claimed in claim 19, wherein the safety vent plug has a softening point of between about 90-100° C.

21. A safety vent plug for a lithium ion secondary battery, the lithium ion secondary battery having a can containing an electrode assembly, the can having an opening formed on an end thereof, and a cap plate coupled to the opening of the can, the cap plate having a coupling hole formed through the cap plate, the safety vent plug comprising:

a body having substantially the same diameter as the coupling hole; and a single catching plate having a diameter that is between about 1.1-2 times larger than the diameter of the body, the catching plate being positioned inside the can containing the electrode assembly at one end of the body;

wherein the safety vent plug is adapted to plug the coupling hole and to soften at a predetermined temperature and open the coupling hole to discharge internal gas.

22. The safety vent as in claim 21, wherein the safety vent plug is plastic.

23. The safety vent as in claim 21, wherein the safety vent plug is made of thermoplastic resin.

24. The safety vent as in claim 21, wherein the safety vent plug has a softening point of between about 70-150 degrees Celsius.

25. The safety vent plug as in claim 21, wherein the thickness of the catching plate corresponds to between about 0.1-0.9 times that of the body.

* * * * *